United States Patent [19]

Chou

[11] Patent Number: 5,593,168
[45] Date of Patent: Jan. 14, 1997

[54] BICYCLE SHOCK ABSORBING ASSEMBLY

[76] Inventor: Chi-nan Chou, No. 9, Chingchuan Rd., Chungyi Village, Taya Hsiang, Taichung Hsien, Taiwan

[21] Appl. No.: 522,094

[22] Filed: Aug. 31, 1995

[51] Int. Cl.⁶ .................................................. B62K 19/00
[52] U.S. Cl. ........................ 280/275; 280/283; 280/287
[58] Field of Search .................................. 280/275, 283, 280/286, 276, 287

[56] References Cited

U.S. PATENT DOCUMENTS

| | | | |
|---|---|---|---|
| 519,855 | 5/1894 | Whitaker | 280/283 |
| 591,306 | 10/1897 | Todson | 280/283 |
| 687,216 | 11/1901 | Foreman | 280/283 |
| 4,162,797 | 7/1979 | McBride | 280/276 |
| 5,149,119 | 9/1992 | Hwang | 280/275 |
| 5,356,165 | 10/1994 | Kulhawik et al. | 280/283 |

*Primary Examiner*—Anne Marie Boehler
*Attorney, Agent, or Firm*—Parkhurst, Wendel & Burr, L.L.P.

[57] ABSTRACT

A bicycle frame with shock absorbing system is used to eliminate the shocking force occurring on the connecting portion of a seat tube fixedly mounted on a bottom bracket and a down tube. The system includes a shock absorber mounted between the seat tube and the down tube. A pair of brackets are integrally formed with bottom bracket and extend toward the down tube. A pivot is fixedly secured to the brackets. A pivot mounting tube is integrally formed on a rear end of the down tube and pivotably mounted on the pivot.

6 Claims, 4 Drawing Sheets

BICYCLE SHOCK ABSORBING ASSEMBLY

FIELD OF THE INVENTION

The present invention is related to a shock absorbing assembly for a bicycle, particularly, for a mountain bike to eliminate a shock occurring on a connecting portion between a seat tube and a down tube thereof.

BACKGROUND OF THE INVENTION

Mountain bikes are getting more and more popular for sport and leisure. To enable a mountain bike to meet the severe terrain of a mountain, the bike is equipped with a plurality of heavy-duty shock absorbers at different positions thereof. However, till now, there is no mountain climbing bike disclosed to be equipped with a shock absorber between a seat tube and a down tube thereof to absorb a shock possibly occurring on a connecting portion of the seat tube and the down tube wherein the connecting portion is also subjected to a large shocking force when the bike is ridden on the mountain.

SUMMARY OF THE INVENTION

It is an objective of the present invention to provide a shock absorbing system mounted between a seat tube and a down tube of a bicycle to eliminate the shocking force occurring on a connecting portion thereof.

A further objective of the present invention is to provide a shock absorbing system mounted between a seat tube and a down tube whereby the two tubes may have a pivotal movement relative to each other.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
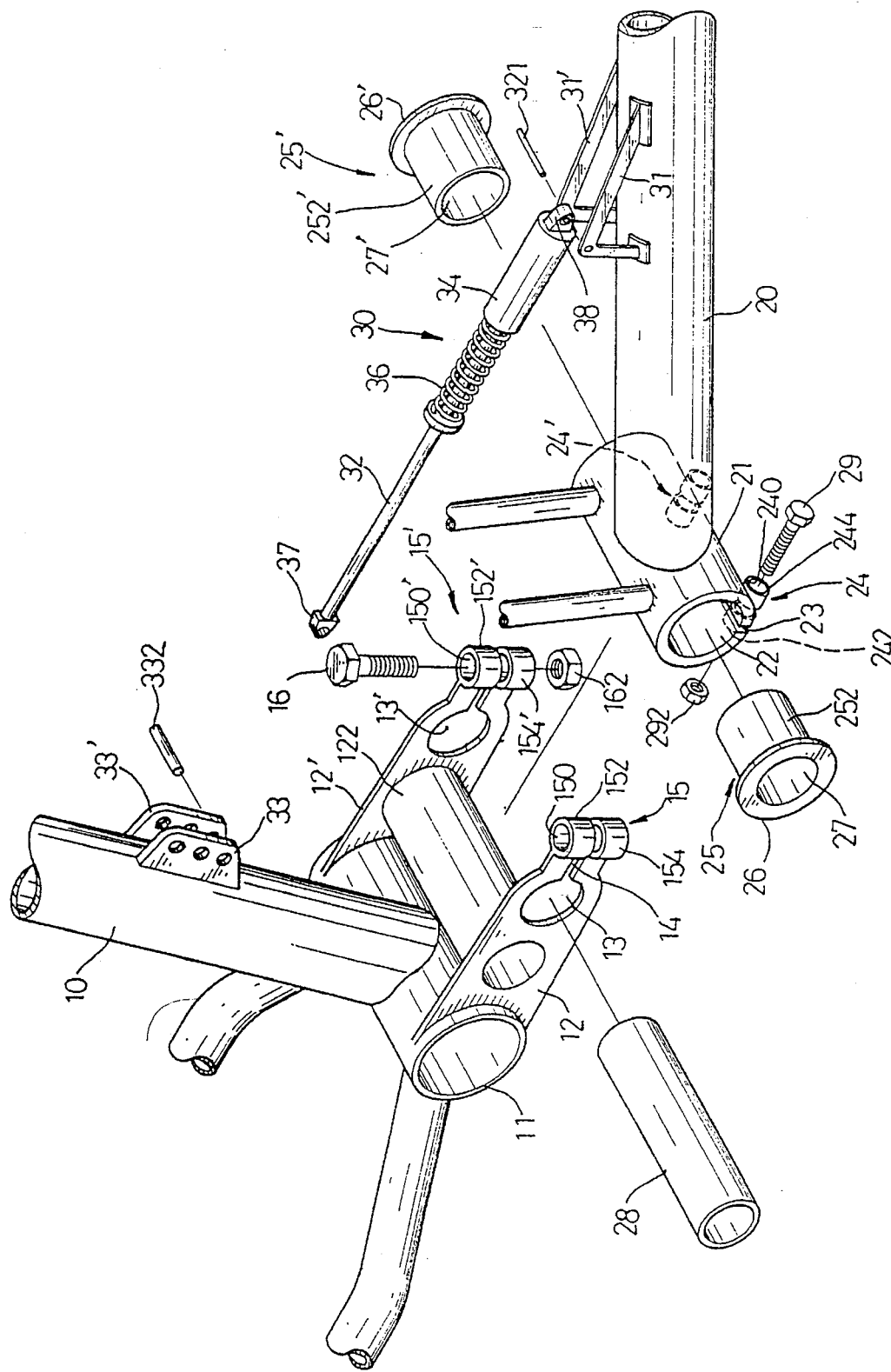
FIG. 1 is an exploded and perspective view showing the parts constituting a bicycle shock absorbing system in accordance with the present invention.
Figure 2:
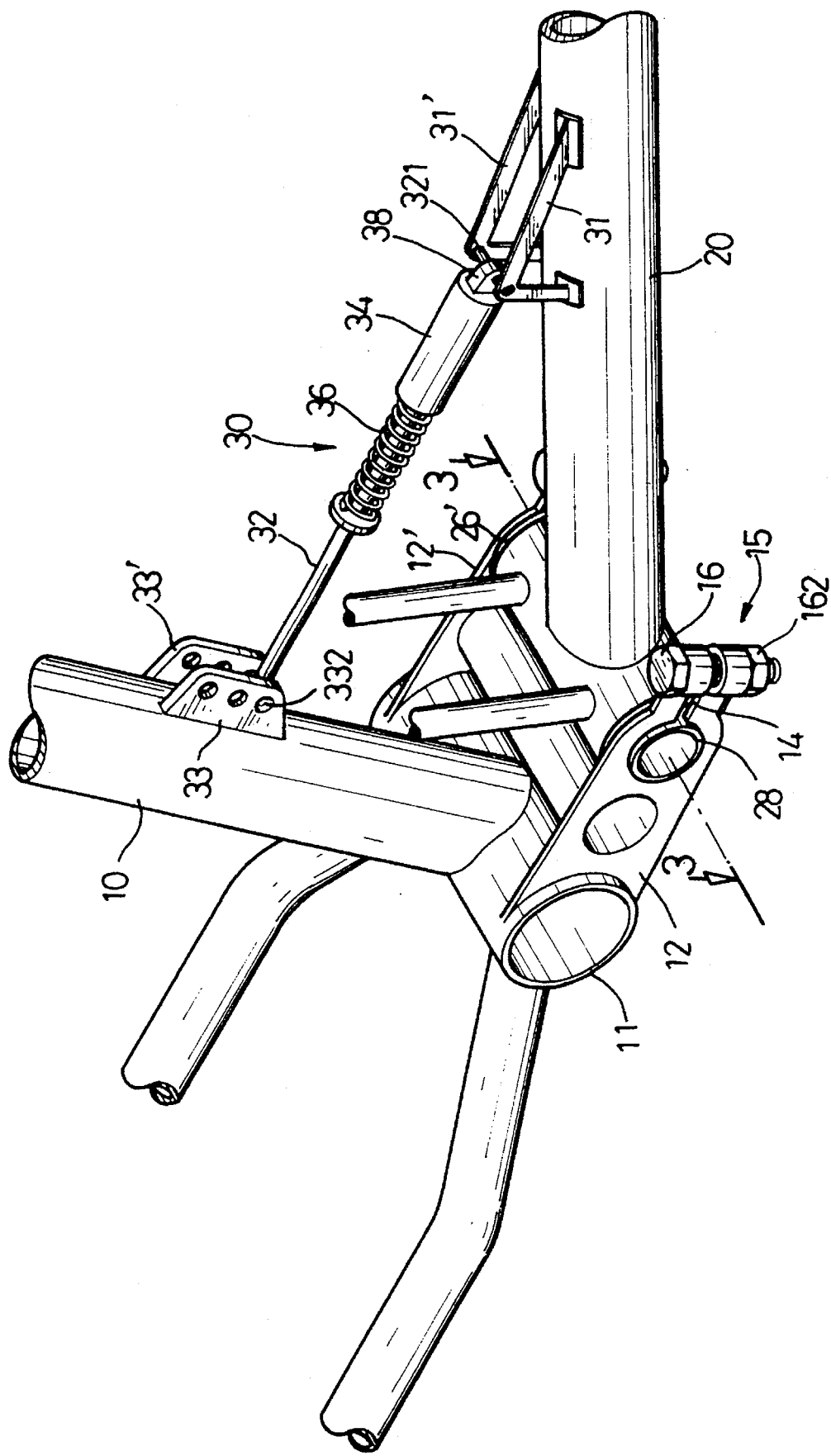
FIG. 2 is a perspective view showing that the parts constituting the preset bicycle shock absorbing system are assembled together.
Figure 3:
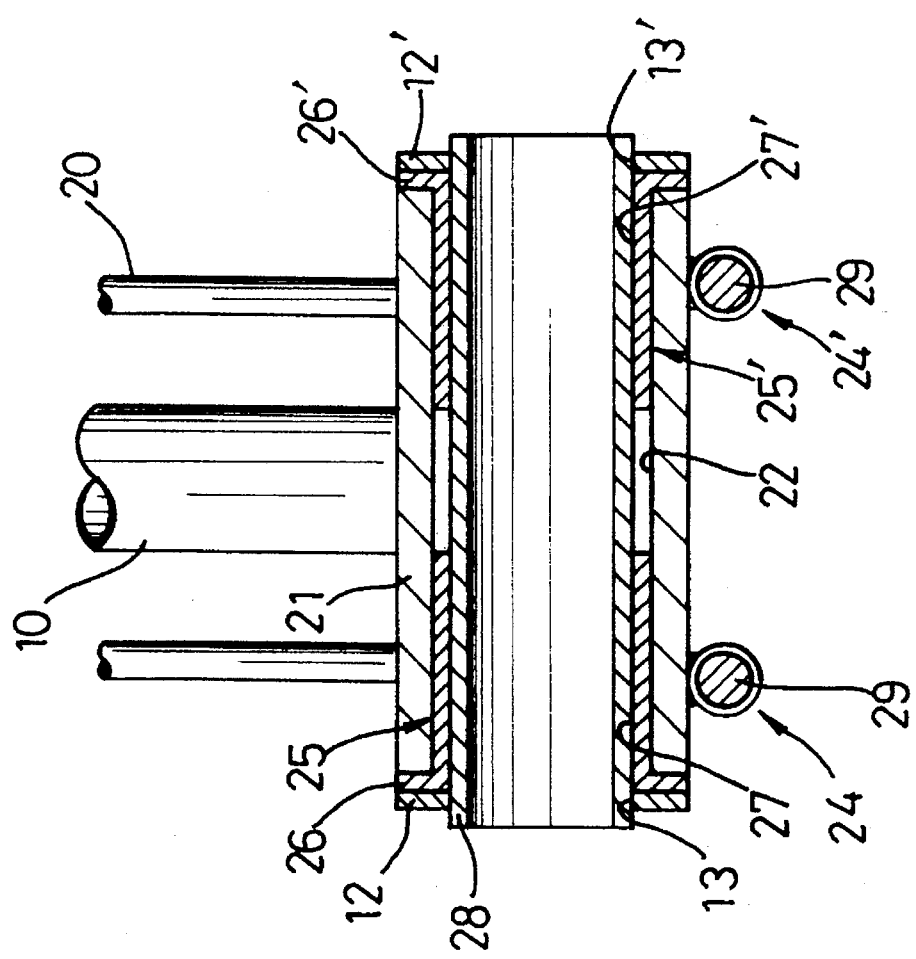
FIG. 3 is a cross-sectional view taken along line 3—3 of FIG. 2.

Referring to FIGS. 1 to 3, the present bicycle shock absorbing system mainly consists of a pair of pivot supporting brackets 12, 12' integrally extending from a bottom bracket 11 and toward a down tube 20, a pivot 28, a pivot mounting tube 21 integrally formed on a rear end of the down tube 20 and a shock absorber 30 mounted between a seat tube 10 and the down tube 20.

The shock absorber 30 is a conventional shock absorber which is consisted of a cylinder 34 having an ear 38 with a hole defined in its distal end, a piston member 32 slideably mounted in the cylinder 34 and having an ear 37 with a hole at a distal end of the piston member 32 and a spring 36 compressibly mounted between the piston member 32 and the cylinder 34.

The seat tube 10 is fixedly mounted on the bottom bracket 11 and is fixedly attached with a pair of mounting brackets 33, 33' with three pairs of holes. A pin 332 is used to connect the piston member 32 to the mounting brackets 33, 33'.

A tubular spacer 122 is mounted between the pivot supporting brackets 12, 12' to keep the two brackets 12, 12' spaced from each other a fixed distance. The brackets 12, 12' are formed to define holes 13, 13' and lugs 15, 15' on their front ends, respectively. Two slits 14 are defined in the brackets 12, 12' to extend from the holes 13, 13' through the lugs 15, 15' to divide the lugs 15, 15' into two halves 152, 154; 152', 154', respectively. Two bolt 16 and nut 162 assemblies (only one is shown in FIG. 1) are threadedly connected onto the lugs 15, 15' by extending the bolts 16 through holes 150, 150' respectively defined on the lugs 15, 15' and then threadedly engaging each of the nuts 162 to a respective bolt 16. The bolt and nut assemblies can exert a clamping force on the brackets 12, 12' defining the holes 13, 13' through the lugs 15, 15', when the bolt and nut assemblies are screwed together tightly.

A tubular pivot 28 is used to be mounted on the pivot supporting brackets 12, 12', with two ends of the pivot 28 being fixedly received in the holes 13, 13'.

A pair of lugs 24, 24' having a structure like that of the lug 15, 15' are provided on a bottom of the pivot mounting tube 21. Each of the lugs 24, 24', for example, the lug 24, is divided into two halves 242, 244 by a slit 23 extending through the lugs 24 and a bottom wall of the pivot mounting tube 21. Two bolt 29 and nut 292 assemblies (only one is shown in FIG. 1) are threadedly connected onto the lugs 24, 24' by extending bolts 29 through holes 240 and then threadedly engaging each of the bolts 29 with a respective nut 292 thereby to exert a clamping force on the pivot mounting tube 21. A bushing receiving hole 22 is defined to extend through the tube 21. A pair of bushings 25, 25' which are made of water-proof rubber are used to be mounted on two ends of the tube 21. The bushings 25, 25' include body portions 252, 252' and flanges 26, 26' and define pivot mounting holes 27, 27' extending therethrough, respectively. Each of the bushings 25, 25', for example, the bushing 25, is mounted on an end of the tube 21 by inserting the body portion 252 into the bushing receiving hole 22 until the flange 26 closely abuts an end face of the end.

Finally, a pair of triangular brackets 31, 31' are fixedly attached on the down tube 20. A pin 321 is used to connect the cylinder 34 to the triangular brackets 31, 31'.

When the parts constituting the present bicycle shock absorbing system are to be assembled on the bicycle, firstly, the shock absorber 30 is mounted between the seat tube 10 and the down tube 20. To achieve this, the pin 332 is used to be inserted into a selected pair of holes on the mounting bracket 33, 33' and the hole on the ear 37 of the piston member 32 wherein the ear 37 is located between the brackets 33, 33', and the ear 38 of the cylinder 34 is mounted between the triangular brackets 31, 31' by inserting the pin 321 through the holes on the brackets 31, 31' and the hole on the ear 38.

Then, the bushings 25, 25' are mounted onto two ends of the pivot mounting tube 21 by inserting the body portions 252, 252' into two ends of the bushing receiving hole 22 until the flanges 26, 26' closely contact two end faces of the two ends of the tube 21, respectively.

Then, the tube 21 with the bushings 25, 25' are brought to a position located between the pivot supporting brackets 12, 12' in which the holes 27, 27' of the bushings 25, 25' are aligned with the hole 13, 13', respectively. Thereafter, the pivot 28 is inserted through the holes 13, 27, 22, 27', 13' to have two ends extending a distance out of the brackets 12, 12', respectively, in which the bushings 25, 25' are pivotable relative to the pivot 28.

Thereafter, the bolt 29 and nut 292 assemblies are threadedly connected on the lugs 24, 24' to exert a clamping force on the tube 21 through the lugs 24, 24' thereby to fixedly engage the bushings 25, 25' on the tube 21.

Finally, the bolt 16 and nuts 162 assemblies are threadedly connected on the lugs 15, 15' to exert a clamping force on the brackets 12, 12' defining the holes 13, 13' to fixedly engage the pivot 28 on the brackets 12, 12'.

Figure 4:
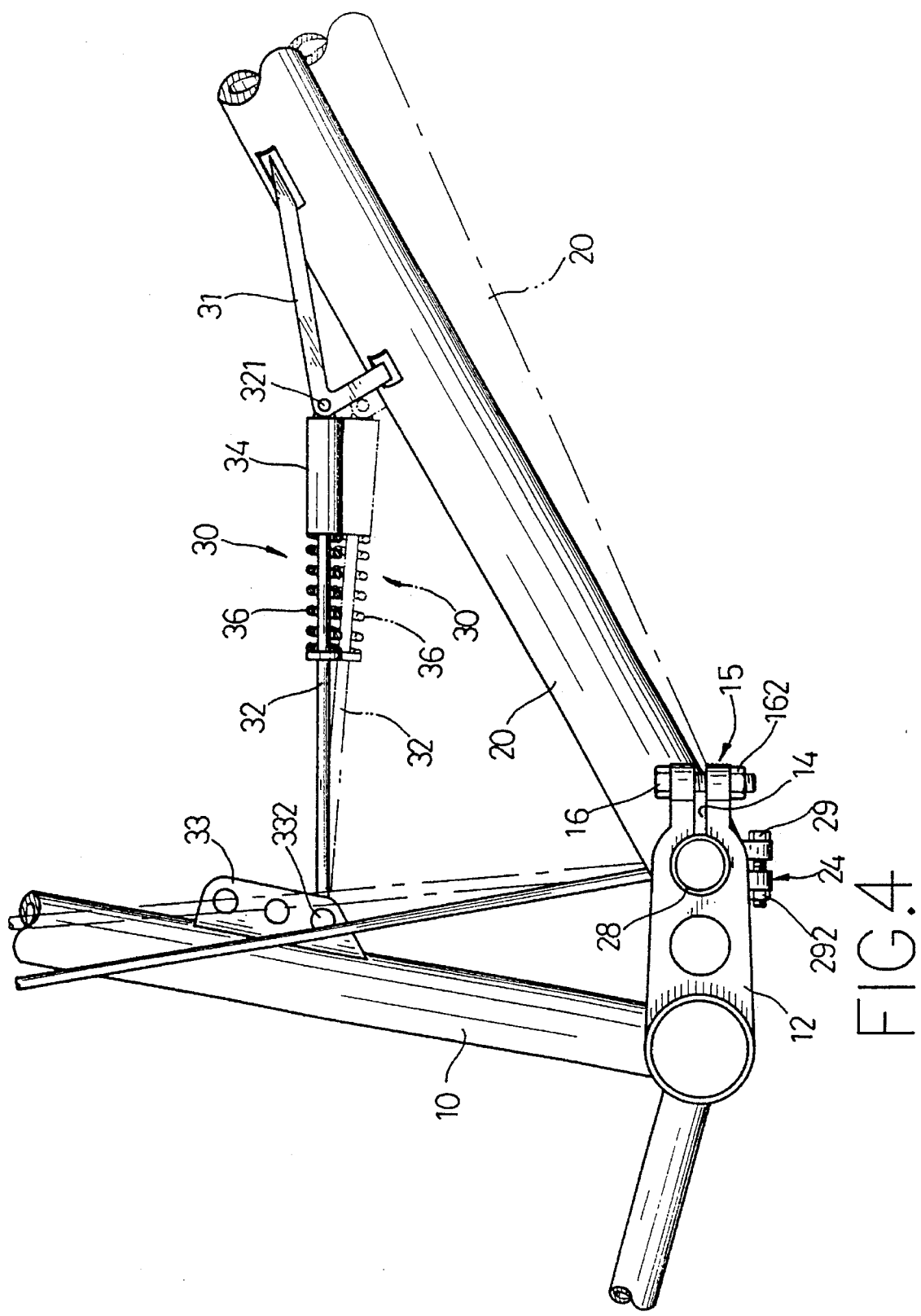
FIG. 4 is a side view of FIG. 2 with phantom lines indicating that the present bicycle shock absorbing system is under action.

Finally, referring to FIG. 4, when the bicycle is subjected to a shocking force when it is ridden over a rugged surface of a road (for example, when the front wheel thereof is passing through a depression on the ground), since the bushings 25, 25', which are fixedly engaged with the pivot mounting tube 21, are pivotable relative to the pivot 28, the down tube 20, which is integrally formed with the mounting tube 21, may pivot relative to the pivot 28 in a clockwise direction to a position as shown by the phantom lines to extend the spring 36 of the shock absorber 30. Thus, the shocking force, which originally will occur on the connecting portion of the seat tube and the down tube of a conventional bicycle, can be eliminated by the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle frame with shock absorbing system, comprising:

a bicycle frame comprising a seat tube connected to a bottom bracket, and a down tube connected to the bottom bracket via pivoting means such that the down tube is pivotal with respect to the bottom bracket, said pivoting means comprising a pair of pivot supporting brackets integrally extending from the bottom bracket and having a pair of supporting holes therein, a pivot mounting tube fixedly connected to the down tube, a pivot received in the pivot mounting tube, said pivot having first and second ends respectively received in the supporting holes, and clamping means for clamping the pivot supporting brackets onto the first and second ends of the pivot; and a shock absorber mounted between the seat tube and the down tube.

2. A bicycle frame with shock absorbing system in accordance with claim 1, wherein the shock absorber comprises:

a cylinder defining a first distal end of the absorber;

a piston member slideably mounted in the cylinder and defining a second distal end of the absorber;

a spring compressed between the cylinder and the piston member;

first shock absorber mounting means for attaching the first distal end to the down tube at a fixed position; and second absorber mounting means for attaching the second distal end to the seat tube at a selected position.

3. A bicycle frame with shock absorbing system in accordance with claim 2, wherein the second distal end is an ear defining a hole therein and the second shock absorber mounting means comprises a pair of mounting brackets fixedly attached on the seat tube, a plurality of pairs of holes defined in the mounting brackets, and a pin extending through the hole in the ear and a selected pair of the holes on the mounting brackets, wherein the ear is located between the mounting brackets.

4. A bicycle frame with shock absorbing system in accordance with claim 1, wherein the pivoting means further comprises a spacer mounted between the pivot supporting brackets and located between the bottom bracket and the pivot supporting holes whereby the space between the pivot supporting brackets is kept constant.

5. A bicycle frame with shock absorbing system in accordance with claim 1, wherein the clamping means comprises two lug assemblies respectively connected to ends of the pivot supporting brackets near the down tube;

each of the lug assemblies comprising a lug defining a hole, a slit defined in the pivot supporting bracket and extending from the pivot supporting hole and through the lug to divide the lug into two separated halves, and a bolt and nut assembly threadedly connected through the lug by extending the bolt through the hole thereof, whereby when the bolt and nut assembly is screwed together tightly, the pivot supporting bracket exerts a clamping force on the pivot.

6. A bicycle frame with shock absorbing system in accordance with claim 4, wherein the pivoting means further comprises two bushings made of water-proof rubber and fixedly mounted in two ends of the pivot mounting tube, said two bushings being used to pivotably bear against the pivot received in the pivot mounting tube.

* * * * *